United States Patent [19]

Sumizawa et al.

[11] Patent Number: 4,748,567
[45] Date of Patent: May 31, 1988

[54] METHOD OF PERFORMING A FAIL SAFE CONTROL FOR AN ENGINE AND A FAIL SAFE CONTROL UNIT THEREOF

[75] Inventors: Akio Sumizawa, Yokosuka; Toshimi Abo, Yokohama; Takashi Ueno, Yokosuka, all of Japan

[73] Assignee: Nissan Motor Co., Ltd., Kanagawa, Japan

[21] Appl. No.: 739,680

[22] Filed: May 31, 1985

[30] Foreign Application Priority Data

Jun. 1, 1984 [JP] Japan ................................ 59-110691

[51] Int. Cl.$^4$ ............................................. F02B 37/12
[52] U.S. Cl. ................................ 364/431.11; 123/479; 60/602
[58] Field of Search .............. 364/431.11; 364/431.01, 364/431.03, 431.07, 431.06, 431.12; 123/479, 489, 435, 425; 60/602

[56] References Cited

U.S. PATENT DOCUMENTS

| | | | |
|---|---|---|---|
| 4,509,331 | 4/1985 | Hirabayashi | 60/602 |
| 4,541,050 | 9/1985 | Honda et al. | 364/431.11 |
| 4,604,701 | 8/1986 | Fujawa et al. | 364/431.11 |
| 4,617,902 | 10/1986 | Hirano et al. | 123/479 |
| 4,638,782 | 1/1987 | Yasuhara et al. | 123/479 |
| 4,660,382 | 4/1987 | Ueno et al. | 60/602 |

Primary Examiner—Parshotam S. Lall
Attorney, Agent, or Firm—Foley & Lardner, Schwartz, Jeffery, Schwaab, Mack, Blumenthal & Evans

[57] ABSTRACT

A fail safe control unit comprising a plurality of detecting means, for parameters, abnormal detecting means, correcting means for correcting a basic control value, and controlling means for controlling a controlled means, e.g. an engine in which a first parameter detected by any one of the detecting means is compared with a predetermined first target value when an abnormal signal is not produced from the abnormal detecting means and the basic control value is corrected in accordance with the difference therebetween, while a second parameter is compared with a predetermined second target value which is set on a more safe side than the first target value when the abnormal signal is produced and a control value is calculated in accordance with the difference therebetween, so as to control the engine.

With this construction, when any one of the detecting means for detecting the parameters becomes defective, the controlled means, e.g. an engine is kept on operating on the safe side. A method of performing a fail safe control for an engine is also disclosed.

9 Claims, 8 Drawing Sheets

METHOD OF PERFORMING A FAIL SAFE CONTROL FOR AN ENGINE AND A FAIL SAFE CONTROL UNIT THEREOF

BACKGROUND OF THE INVENTION (1) Field of the Invention

The present invention relates to a method of performing a fail safe control for controlled means, i.e. an engine and a fail safe control unit thereof in which different parameters representative of operating conditions of the engine are detected by detecting means and it controls and operates the engine on a safe side when any detecting means for detecting the parameters becomes defective.

(2) Description of the Prior Art

As a control unit for detecting different parameters representative of operating conditions of controlled means and for operating the controlled means as a desired condition in accordance with the parameters thus detected, there is an engine control unit having a variable capacity turbocharger. In the variable capacity turbocharger, the turbo engine is rotated by utilizing the exhaust gas of the engine and the supercharge pressure of inlet air to be supplied to the engine is controlled by the operation of a compressor by the rotation of the turbine, while the cross sectional area of inlet path or guide path of the exhaust air to the turbine is varied and the supercharger pressure of the inlet air to be supplied to the engine is properly controlled by supplying the exhaust gas from the engine to the turbine through the guide path thus controlled, thereby increasing the engine torque from a low speed zone to a high speed zone.

The Japanese Lying-Open Patent specification sho 58-162918 discloses one of these units. FIG. 1 shows a block diagram of a control unit for the variable capacity turbocharger according to the prior art.

In FIG. 1, the control unit 2 comprises an operational unit 4, a duty value calculating unit 6, an subtracter 14, and an operational unit 18. In addition, in FIG. 1, the reference numeral 1 indicates an engine, numeral 10 indicates a magnetic valve, and nemeral 12 indicates a supercharge pressure sensor 12.

The operational unit 4 calculates fuel supply pulse width $T_P$ which represents an engine load and corresponds to air flow rate for every one revolution of the engine, from the inlet air flow rate $Q_A$ and the engine speed Ne detected by an air flow meter and a crank angle sensor not indicated, respectively and it supplies the fuel supply pulse width $T_P$ and the engine speed Ne thus calcuated, to the duty value calculating unit 6.

The duty value calculating unit 6 having a stored table of suitable duty values to the fuel supply pulse width $T_P$ and the engine speed Ne, looks up the table in accordance with the fuel supply pulse width $T_P$ and the engine speed Ne inputted and produces a corresponding duty value. The duty value thus produced is applied to the electromagnetic value 10 after correction of the value through the adder, which will be described later, and is controlled in such a manner that the supercharge pressure of the inlet air to be supplied to the engine 1 through the variable capacity turbocharge becomes equal to a preset value corresponding to the duty value thus calculated.

However, also in such a control system as described above, in order to remove the effects of dispersion of the parts constituting the electromagnetic valves, actuators etc., and of the change in the time elapsed thereof, the supercharge pressure $P_2$ of the inlet air to be supplied to the engine 1 is detected by the supercharge pressure sensor 12 and is applied to the inverting input terminal of the subtracter 14 in the control unit 2. In the non-inverting input terminal of the subtracter 14, there is supplied a target supercharge pressure $P_{sl}$ from the target supercharge pressure setting portion 16. In the subtracter 14, the actual supercharge pressure $P_2$ detected by the supercharge pressure sensor 12 is subtracted from the target supercharge pressure $P_{sl}$, the deviation P of the actual supercharge pressure $P_2$ from the target supercharge presure $P_{sl}$ is calculated, and it is supplied to the operational unit 18. Various mathematical operations such as proportional, integral, and differentiating operations (PID operations) are carried out about the devaition P and the deviation of the duty values is calculated in the operational unit 18 and then, the result of the calculation is applied to the adder 8, thus correcting the duty value supplied from the duty value calculating unit 6.

In the control unit, the duty value as a basic control value is calculated in accordance with the parameters such as the engine speed Ne and the inlet air flow rate $Q_A$ detected by the crank angle sensor and the air flow meter and the electromagnetic valve 10 is controlled by the duty value, thus controlling the supercharge pressure of the inlet air which is supplied to the engine, so as to reach a predetermined preset value. However, when any one of sensors such as the crank angle sensor, the air flow meter, becomes defective, the values thus detected can not be obtained and a suitable control can no longer be carraied out. As a result, there is a possibility that the engine will be damaged because of an abnormally high supercharge pressure, as the case may be.

Namely, as in the case of the variable capacity turbocharger described above, in the control unit which controls the operation of the controlled means in accordance with the result of the detection of the parameters, when any detecting means for detecting the parameters becomes defective, the control can no longer become possible. Even if such a condition described above occurs, it is desirable to secure the control of the controlled means.

SUMMARY OF THE INVENTION

It is therefore an object of the present invention to provide a fail safe control unit in which even if detecting means for detecting parameters representative of operating conditions of the controlled means, and as basic data for calculating a basic control value by which the controlled means is controlled at a desirable condition, the controlled means can be securely operated on the safe side.

It is another object of the present invention to provide a fail safe control unit having a plurality of sensors for detecting different parameters, abnormal detecting means, and correcting means in which the actual supercharge pressure is compared with a first target supercharge pressure when an abnormal signal is not produced and corrects the basic control value in accordance with the difference therebetween and the actual supercharge pressure is compared with a second target supercharge pressure which is lower than the first tharget supercharge pressure when the abnormal signal is produced and controls the controlled means so as to cancel the difference.

It is still another object of the present invention to provide a method of performing a fail safe control for an engine in which different parameters representative of operating conditions of the engine are detected, calculates a control value and controls the engine on the safe side when any of detecting means for detecting the parameters becomes defective.

One of the features of the present invention resides in a fail safe control unit for controlling a controlled means i.e. an engine in a desired condition in accordance with the different parameters, which comprises; first detecting means for detecting at least one first parameter representative of the operating conditions of the controlled means, second detecting means for detecting a second parameter representative of the operating conditions of the controlled means, operational means for calculating a basic control value which controls the controlled means into a desired condition in accordance with the first parameter dtected by the first detecting means, abnormal detecting means for detecting an abnormal condition of the first detecting means and for producing an abnormal signal, correcting means for correcting the basic control value, by comparing the first parameter detected by the first detecting means with a predetermined first target value when the abnormal signal is not produced from the abnormal detecting means, in accordance with the difference therebetween, and controlling means for calculating a control value and for controlling the controlled means, by comparing the second parameter detected by the second detecting means with a predetermined second target value which is set on a more safe side than the first target value to the controlled means when the abnormal signal is produced from the abnormal detecting means, in accordance with the difference.

Another feature of the present invention resides in a method of performing a fail safe control for a controlled means i.e. an engine in accordance with different parameter, which comprises the steps of detecting at least one first parameter representative of the operating conditions of the controlled means through first detecting means, detecting a second parameter representative of the operating conditions of the controlled means through second detecting means, calculating through operational means a basic control value which controls the controlled means in a desired condition in accordance with the first parameter detected by the first detecting means, detecting an abnormal condition of the first detecting means, correcting the basic control value by comparing the first parameter detected by the first detecting means with a predetermined first target value through correcting means when the abnormal signal is not produced from the abnormal detecting means, in accordance with the difference therebetween, and calculating a control value and controlling the controlled means through controlling means, by comparing the second parameter detected by the second detecting means with a predetermined second target value which is set on a more safe side than the first target value to the controlled means when the abnormal signal is produced from the abnormal means, in accordance with the difference therebetween.

These objects, features and advantages will be apparent from the detailed description of the embodiments of the invention with reference to the accompanying drawings.

DESCRIPTION OF THE PREFERRED EMBODIMENT

Figure 2:
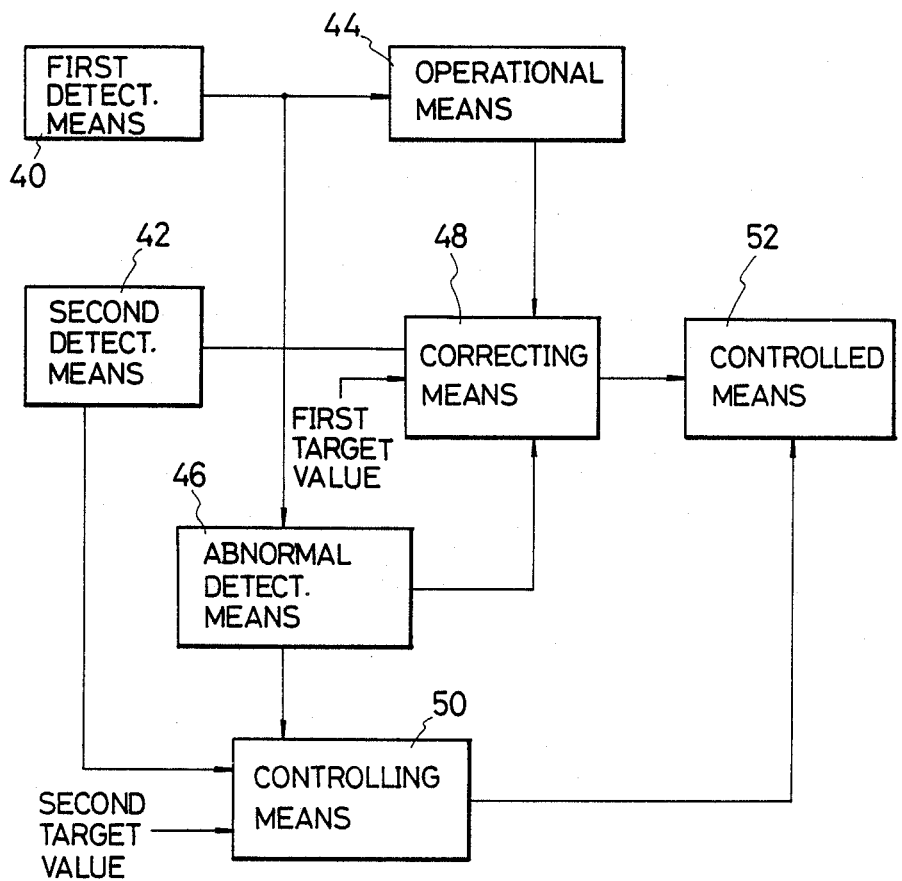
FIG. 2 is a basic fail safe control concept according to the present invention.

FIG. 2 shows a basic concept of the method of fail safe control for controlled means and the fail safe control unit, according to the present invention.

The fail safe control unit shown in FIG. 2 comprises first detecting means 40 for detecting at least one first parameter representative of the operating conditions of the controlled means 52 such as an engine, second detecting means 42 for detecting a second parameter representative of the operating conditions of the control means, operational means 44 for calculating a basic control value which controls the controlled means in a desired condition in accordance with the first parameter detected by the first detecting means, abnormal detecting means 46 for detecting an abnormal condition of the first detecting means and for producing an abnormal signal, correcting means 48 for correcting the basic control value, by comparing the first parameter detected by the first detecting means with a predetermined first target value when the abnormal signal is not produced from the abnormal detecting means, in accordance with the difference therebetween, and controlling means 50 for controlling the controlled means by comparing the second parameter detected by the second detecting means with a predetermined second target value which is set on a more safe side than the first target value to the controlled means when the abnormal signal is produced from the abnormal detecting means, in accordance with a control value calculated from the difference between the second parameter detected by the second detecting means and the predetermined second target value.

Figure 3:
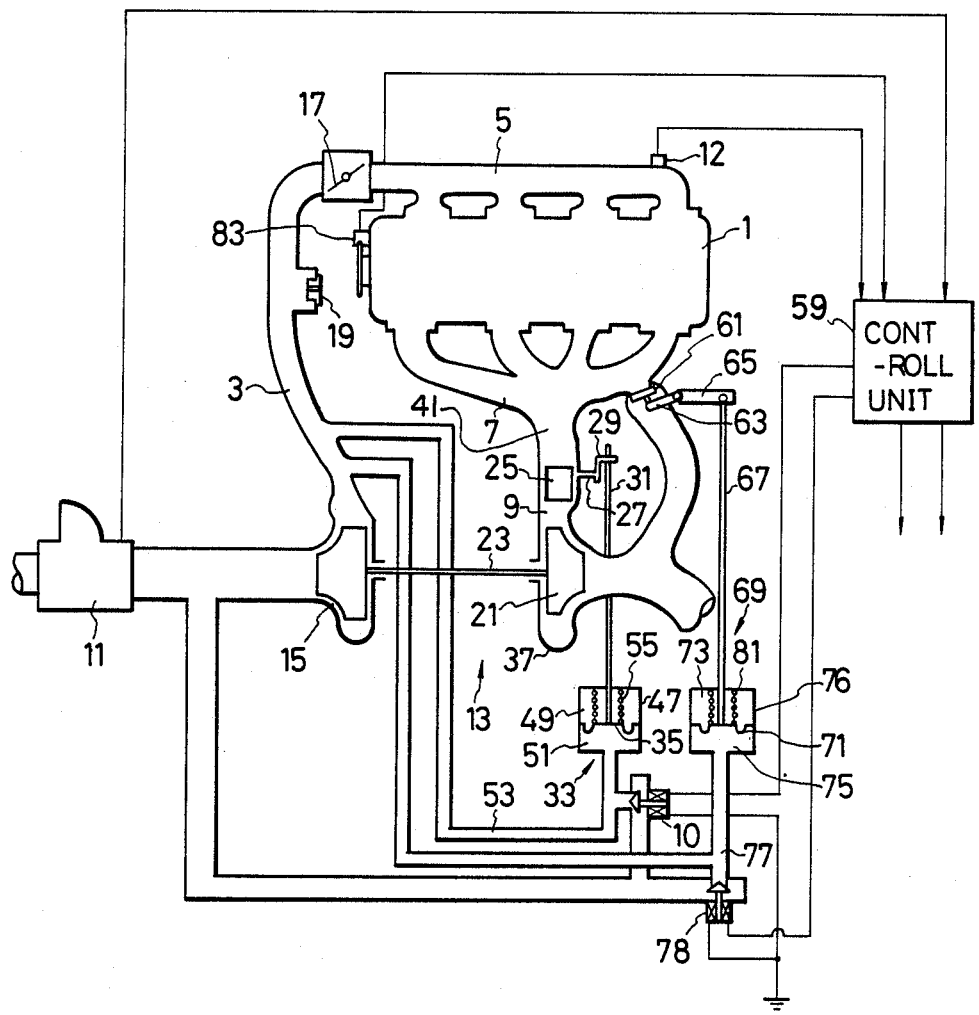
FIG. 3 is an overall control system for a variable capacity turbocharger to which the fail safe control unit according to the present invention is applied.
Figure 4:
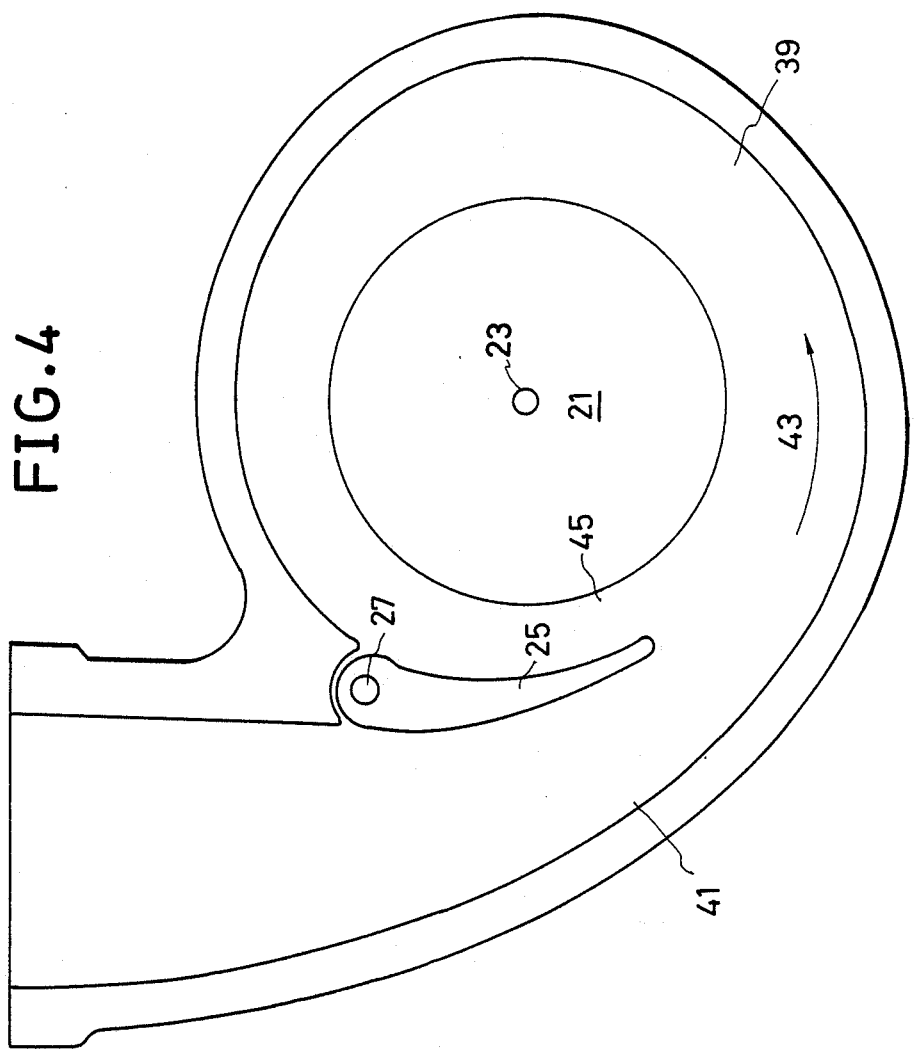
FIG. 4 is an enlarged sectional view of the variable capacity portion of the variable capacity turbocharger.

Referring to FIG.3, where an engine system having a variable capacity turbocharger to which the present invention is applied. In FIG. 3, air is supplied to an engine 1 through an inlet pipe 3 and an inlet manifold 5 and exhaust gas is discharged through an outlet manifold 7 and an exhaust pipe 9.

At the left end of the inlet pipe 3, there is provided an air flow meter 11 for measuring the inlet air flow rate $Q_A$ and at the opposite side of the inlet pipe 3 there is provided a compressor 15 which constitutes part of the turbocharger 13, which supplies inlet air supplied through the air flow meter 11 to the engine 1 after pressureizing the air.

At the base end portion of the inlet pipe 3 adjacent to the inlet manifold 5, there is provided a throttle valve 17 while a discharge valve 19 is provided between the compressor 15 and the throttle valve 17.

A turbine chamber 37 is formed at the bottom of the exhaust pipe 9 and a turbine 21 is provided within the turbine chamber 37, which is linked with the compressor 15 by a link shaft 23. The turbine chamber 37 is provided with a scroll 39 surrounding the turbine 21. The scroll 39 is formed in such a manner that the cross sectional area thereof is gradually reduced toward the down stream from a guide path 41 as shown by the arrow 43.

At the confluence of the guide path 41 to the scroll 39 and the terminal end 45 of the scroll 39, there is provided a movable tongue 25 as a capacity changing means which constitutes a flap valve. The movable tonque 25 is pivotally supported by a shaft 27 so as to adjust the sectional area of the guide path 41. The movable tonque 25 is provided within the exhaust pipe 9, in FIG. 3, near the upstream of the guide path 41 in the turbine 21. The shaft 27 pivotally supporting the movable tonque 25 is linked to the upper end of a rod 31 through an arm 29 and the lower end of the rod 31 is linked to a diaphragm 35 which constitutes an actuator 33 for driving the movable tonque 25.

A housing 47 having the diaphragm 35 is divided by the diaphragm 35 into an atmospheric chamber 49 and a positive pressure chamber 51. The atmospheric chamber 49 is provided with a spring 55 which is urged so as to push the diaphragm 35 toward the positive pressure chamber 51. The positive pressure chamber 51 of the actuator 33 is coupled to the inlet pipe 3 at the down stream of the compressor 15 through a liaison pipe 53 and the supercharge pressure formed in the compressor 15 is supplied to the positive chamber 51 and it pushes the diaphragm 35 toward the atmospheric chamber 49 against the force of the spring 55. An electromagnetic valve 10 is provided on the liaison pipe 53. When the electromagnetic valve 10 is opened by the operation of the control unit 59, the liaison pipe 53 is communicated with the atmosphere through the electromagnetic valve 10 and the pressure within the positive pressure chamber 51 is lowered.

More specifically, the electromagnetic valve 10 is controlled by the control unit 59 in its duty ratio in such a manner that the more the duty value becomes, the more the degree of opening of the electromagnetic valve 10 becomes large and the pressure within the positive pressure chamber 51 is lowered. As a result, the diaphragm 35 moves downward by the action of the spring 55 of the atomspheric chamber 49 and this movement of the diaphragm is transmitted to the movable tongue 25 through the rod 31, the arm 29 and the shaft 27 and the movable tongue 25 begins to pivot in the direction which reduces the guide path 41 which introduces the exhaust gas to the turbine 21 i.e. in the direction of disclosure of the guide path 41, with the result that the flow velocity of the exhaust gas to be supplied to the turbine 21 becomes fast and the supercharge pressure to the engine 1 is increased by the compressor 15.

Alternatively, when the duty value becomes small, the degree of opening of the electromagnetic valve 10 also becomes small and the pressure within the positive pressure chamber 51 increases, so that the diaphragm 35 now moves upward against the force of the spring 55, thereby causing the pivotal movement of the movable tongue 25 in the direction of disclosure of the guide pah 41. As a result, the flow speed to be supplied to the burbine 21 becomes slow and the supercharge pressure to the engine 1 due to the compressor 15 is lowered.

Returning to FIG. 3, at the right bottom portion of the exhaust manifold 7, there is provided a waste gate valve 61 which is linked to one end of an action rod 67 through an aum 63 and a linkage member 65, while the other end of the action rod 67 is linked to a diaphragm 71 of an actuator 69 for driving the waste gate valve. A housing 76 having a diaphragm 71 is divided into an atmospheric chamber 73 and a positive pressure chamber 75 by the diaphragm 71. The atmospheric chamber 73 is provided with a spring 81 which is urged so as to push the diaphragm 71 toward the positive pressure chamber 75. The positive pressure chamber 75 is communicated with the inlet pipe 3 at the downstream of the compressor 15 through a liaison pipe 77 and the supercharge pressure formed within the compressor 15 is supplied to the positive pressure chamber 75.

On the liaison pipe 77, there is provided an electromagnetic valve 78 which, when opened by the driving of the control unit 59, permits the liaison pipe 77 to be communicated with the atmosphere and the pressure within the positive pressure chamber is lowered. More specifically, the electromagnetic valve 78 is duty-controlled by the control unit 59, so that the more the duty value becomes large, the more the degree of opening of the electromagnetic valve becomes large and the pressure within the positive pressure chamber is lowered. As a result, the diaphragm 71 moves downward by the action of the spring 81 of the atmospheric chamber and this moving action is transmitted to the waste gate valve 61 through the rod 67 and the arm 63, thus moving the waste gate valve 61 in the direction of the disclosure of the bypass path.

Alternatively, the more the duty value becomes small, the more the degree of opening of the electromagnetic valve 78 becomes small also small and the pressure within the positive pressure chamber increases. As a result, the diaphragm now moves upward against the force of the spring 81, thereby moving the waste gate valve 61 in the direction of opening. The purpose of the waste gate valve 61 is to discharge part of the exhaust gas of the engine outward and to introduce a suitable supercharge pressure into the engine by reducing the exhaust gas which is applied to the turbine, in order to prevent the engine being damaged due to the excessive supercharge of the inlet air to be supplied to the engine from the turbocharger, when the engine becomes a high speed and high load condition.

The control unit 59 comprises a microprocessor, including a CPU (Central Processing Unit), a RAM(random access memory) and a ROM (read only memory) an input/output interface, and a A/D converter not shown, and the inlet air flow rate $Q_A$ is supplied to the control unit 59 from the air flow meter 11 through the interface while it is also supplied with the engine speed Ne from the crank angle sensor 83 provided at the left side of the engine 1 and supplied with the supercharge pressure $P_2$ from a supercharge pressure sensor 12 provided at the engine 1. The control unit 59 conveniently controls the duty value of each of control signals for driving the electromagnetic valves 10 and 70 in accordance with the information or parameters from the sensors and also conveniently control the supercharge pressure of the inlet air to be supplied to the engine 1 by varying the sectional area of the guide path 41 for the exhaust gas to be supplied the turbine 21 through the movable tongque 25, thus increasing the torque from the low speed zone to the high speed zone.

Furthermore, in the high speed zone, when the supercharge pressure becomes high more than required, the waste gate valve 61 is opened and a suitable supercharge pressure is applied to the engine 1, so as to prevent the torque of the engine 1 from being lowered. More specifically the micorprocessor in the control unit 59 calculates the fuel supply pulse width $T_P$ for an electronically controlled fuel injector member from the inlet air flow rate $Q_A$ and the engine speed Ne supplied through the interface in accordance with a control program stored in the memory in the control unit 59, by the following equation;

$$T_P = K \cdot Q_A / Ne$$

where, K indicates a constant.

Figure 5:
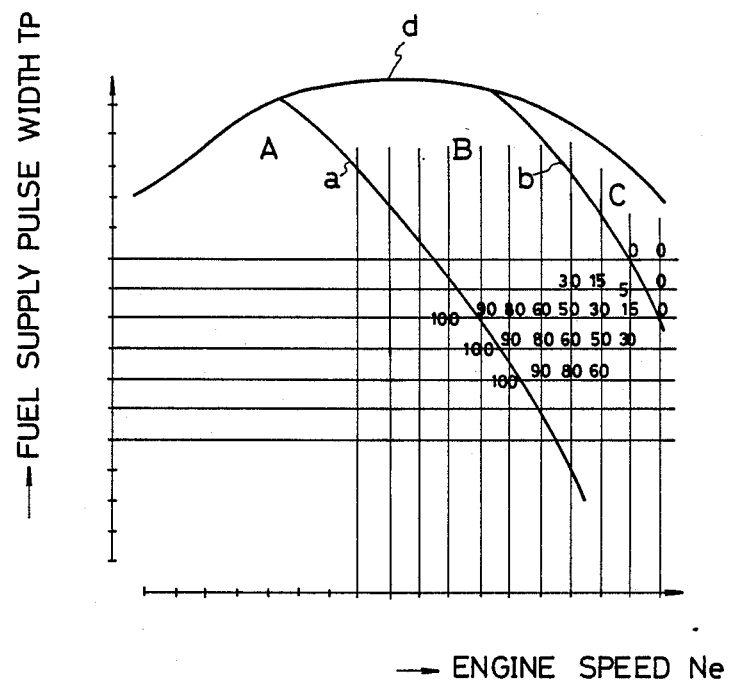
FIG. 5 is a characteristic table for calculating each of suitable duty values in accordance with the engine speed Ne and the fuel supply pulse width $T_P$, which also shows a relationship between the engine speed and the pulse width, with the sectional area of a guide path being one parameter.

The fuel supply pulse width $T_P$ thus calculated indicates a parameter representative of the engine load and the duty value for driving the electromagnetic valve 10 by looking up a table as shown in FIG. 5 in accordance with the fuel supply pulse width $T_P$ and the engine speed Ne.

FIG. 5 shows a table of data of the duty values preliminarily obtained by experiments in which a suitable supercharge pressure is obtainable from the engine speed Ne and the fuel supply pulse width $T_P$. Namely, the duty value is sought from the table in accordance with the engine speed Ne and the fuel supply pulse width $T_P$ and inlet air having a suitable supercharge pressure is introduced into the engine 1 by driving the electromagnetic valves 10 and 78 at the duty value thus sought and the torque of the engine 1 can be increased from the low speed zone to the high speed zone.

In the table shown in FIG. 5, the zone indicated by the mark A belongs to a small air flow rate zone, where the supercharge pressure of the inlet air to be supplied to the engine does not reach a predetermined value, for instance, +350 mmHg, even if the cross sectional area of the guide path 41 for the exhaust gas is made minimum. Accordingly, in order to operate the engine in this zone, with the cross sectional area of the guide path 41 being minimum, the control unit 59 supplies a driving signal having the duty value of, for instance, 100% to the electromagnetic valve 10, so that the pressure within the positive pressure chamber 51 is lowered to the atmospheric pressure, with the electromagnetic valve 10 in the opened condition. As a result, the diaphragm 35 is pushed toward the positive pressure chamber 51 by the spring 55, so that the movable tongue 25 is operated so as to close the guide path 41 through the rod 31, the arm 29 and the shaft 27 and the cross sectional area of the guide path 41 is made minimum, i.e. a fully closed condition.

The zone marked with C indicates a large air flow rate zone, where there is a possibility of the engine's being damaged as the supercharge pressure of the inlet air to be supplied to the engine will become excessively high beyond the predetermined value, even if the sectional area of the guide path 41 is made maximum, i.e. a fully opened condition. As a resut, in this zone, the electromagnetic valve 78 is duty-controlled, while the waste gate valve 61 is gradually opened by operating the actuator 69 for driving the waste gate valve and the supercharge pressure is controlled constant, with the exhaust gas which is supplied to the turbine 21 being bypassed. Moreover, in this zone, in order to make the guide path 41 of the turbine maximum, the duty value of the electromagnetic valve 10 is set at zero percent (0%) and it is in the fully closed condition. Namely, since the electromagnetic valve 10 is in the fully closed condition, the supercharge pressure at the downstream of the compressor 15 is supplied as it is, and the diaphragm 35 is pushed toward the atmospheric chamber 49 against the resilient force of the spring 55. As a result, the movable tongue 25 now moves in the direction of the opening of the guide path 41 through the rod 31, the arm 29, and the shaft 27 and the cross sectional area of the guide path 41 can be made in the maximum condition. Namely, since the electromagnetic valve 10 is in the fully closed condition, the supercharge pressure at the downstream of the compressor 15 is supplied as it is, and the diaphragm 35 is pushed toward the atomospheric chamber 49 against the resilient force of the spring 55. As a result, the movable tonque 25 now moves in the direction of the opening of the guide path 41 through the rod 41, the arm 29, and the shaft 27 and the cross sectional area of the guide path 41 can be made in the maximum condition.

The zone marked with B is the zone located between the Zone A and the Zone B, where the supercharge pressure can be controlled by the position of the movable tongue 25, i.e. the sectional area of the guide path 41, and the duty value has been determined by experiments so as to be a suitable preset supercharge pressure in accordance with each operating point.

In addition, in FIG. 5, the curves a, b, etc., shows respectively a characteristic curve indicative of a relationship between the fuel supply pulse width $T_P$ vs the engine speed Ne, i.e. torque characteristics, when the sectional area of the guide path 41 is fixed both at minimum value and at maximum value. As shown in the characteristic curves, when the cross sectional area 41 is fixed at a certain value, the fuel supply pulse width $T_P$ lowers as the engine speed Ne increases, while when the sectional area of the guide path 41 is changed ideally in accordance with the engine speed Ne, the torque can be increased over the entgire zones of the engine speed Ne, the torque can be increased over the entire zones of the engine speed Ne as shown by a curve d which is an envelope of each of the curves a, b, c, etc.

Figure 1:
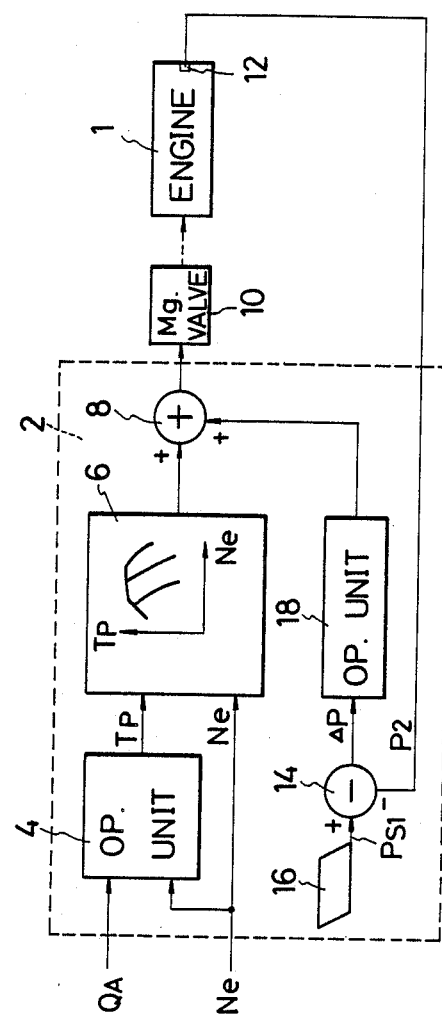
FIG. 1 is a block diagram of the control unit for a variable capacity turbocharger, according to the prior art.
Figure 6:
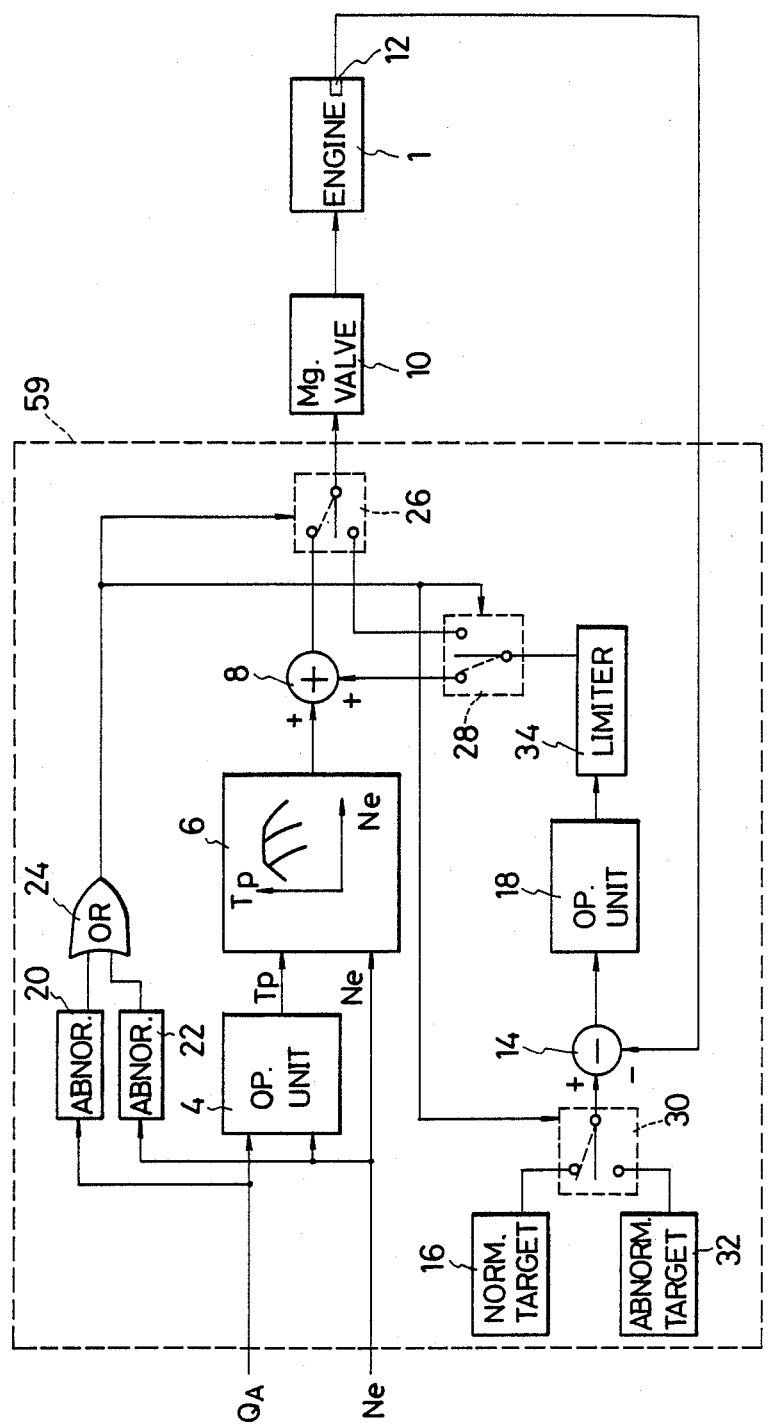
FIG. 6 is a construction of the fail safe control unit according to one embodiment of the present invention.

FIG. 6 shows one embodiment of the fail-safe-control unit according to the present invention. The control unit 59 1 comprises an air flow meter abnormal decision unit 20 for monitoring the inlet air flow rate $Q_A$ from the air flow meter and for determining whether or not the air flow meter is normal or abnormal, a crank angle sensor abnormal decision unit 22 for monitoring the engine speed Ne from the crank angle sensor and for determining if the crank angle sensor is normal or abnormal, an OR circuit 24 for taking a logical sum of the output signals from the air flow meter abnormal decision unit 20 and the crank angle sensor abnormal decision unit 22, first, second, and third change-over switches 26, 28, and 30 operative in an interlocking manner by the output signal from the OR circuit 24, an abnormal time target supercharge pressure setting portion 32 connnected to one terminal side of the third change-over switch 30, and a limiter 34 connected between the output of an operational unit 18 and the arm of the second switch 28, and the remaining constructing elements are same as those shown in FIG. 1.

The crank angle sensor abnormal decision unit 22 can determine, for instance, that the crank angle sensor is in the abnormal condition from the fact that the output signal is not produced from the crank angle sensor during the cranking operation. The air flow meter abnormal decision unit 20 can determine an abnormal condition from the value of the inlet air flow rate $Q_A$ detected, especially from the A/D converted value, when a wiring lead is cut or short-circuited.

The first, second, and third change-over switches 26, 28, and 30 are connected to a contact indicated by the dotted line respectively, in the normal condition. Namely, in this case, the first switch 26 connects the output of the adder 8 to the electromagnetic valve 10, the second switch 28 connects the output of the limiter 34 to the adder 8, and the third switch 30 connects the output of the normal time target supercharge pressure setting portion 16 to the non-inverting input terminal of the subtracter 14. When the air flow meter abnormal decision unit 20 or the crank angle sensor abnormal decision unit 22 detects the abnormal condition of the air flow meter or the crank angle sensor and produces an abnormal signal to the OR circuit 24, the first, second, and third switches 26, 28, and 30 are operated respectively by the output from the OR circuit 24. In this case, the first switch 26 connects the output from the limiter 34 to the electromagnetic valve 10 through the second switch 28 and the third switch 30 connects the output from the abnormal time target supercharge pressure setting portion 32 to the non-inverting input ter,byHinal of the subtracter 14. The operation of each switch enables the fuel supply pulse width $T_P$ to be calculated in accordance with the inlet air flow rate $Q_A$ and the engine speed Ne and the duty value is calculated by looking up the table from the fuel supply pulse width $T_P$ and the engine speed Ne. The control operation for driving the electromagnetic valve 10 by the duty value thus calculated, is stopped and the abnormal time supercharge pressure $P_{S2}$ of the abnormal time target supercharge pressure setting portion 32 which is connected to the subtracter 14 through the first and second switches 26 and 28 is subtracted by the actual supercharge pressure $P_2$ from the supercharge pressure sensor 12. A correction control value calculated in the operational unit 18 in accordance with the difference between the preset supercharge pressure and the actual supercharge pressure is applied to the electromagnetic valve 10 through the limiters 34, the second and first switches 28 and 26, thus driving the electromagnetic valve 10. Namely, according to the present invention, the control of the electromagnetic valve is carried out by a mere feedback correction.

When the control is performed only by the feedback correction, there is a possibility that the speed of the control can no longer catch up with the change in the supercharge pressure due to the delay in the feedback loop and the overshoot of the supercharge prressure occurs. In addition, the supercharge pressure often becomes abnormally high. According to the present invention, in order to prevent the overshoot from occurring, the target supercharge pressure at the abnormal time which is set at the abnormal time target supercharge pressure setting portion 32 is set at a value lower than the normal time target supercharge pressure which is set at the target supercharge pressure setting portion 16. Moreover, the limiter 34 is provided so as to limit the upper and lower limits of the correction values calculated in the operational unit 18.

Figure 7:
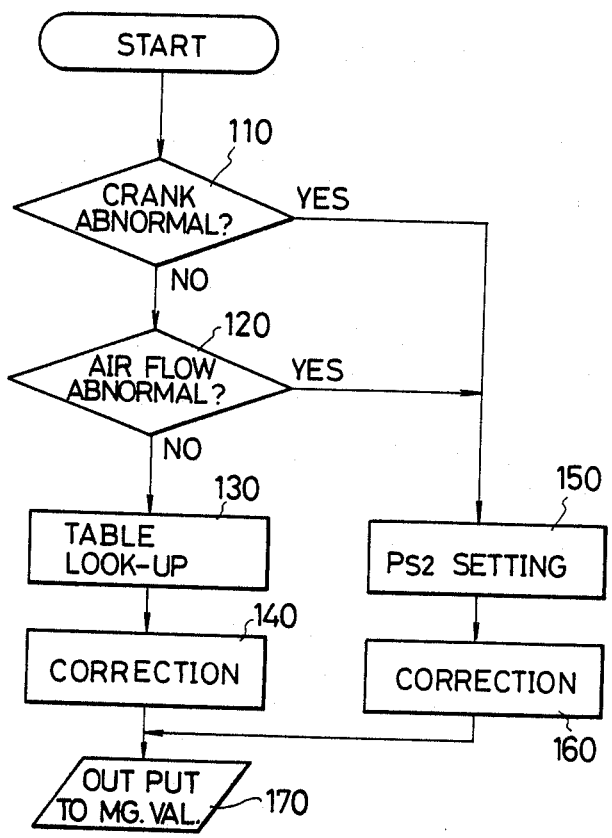
FIG. 7 is a fail safe control flow chart for explanining the operation of the fail safe control unit, according to the present invention.

The operation of the fail safe control unit according to the present invention will now be described with reference to the control flow chart shown in FIG. 7. After the program is, started, the crank angle sensor abnormal decision unit 22 determines if the crank angle sensor is normal or abnormal in the step 110. If the result of the decision is NO, the operation moves to the next step 120, where the air flow meter abnormal decision unit 20 determines if the air flow meter is normal or abnormal. If the result of the decision is NO, that is the air flow meter is normal, the operation now moves to the next step 130.

In the step 130, the fuel supply pulse width $T_P$ is calculated from the engine speed Ne and the inlet air flow rate $Q_A$, and the table look-up operation is performed in the duty value calculating unit 6 by the fuel supply pulse width $T_P$ thus calculated and the engine speed Ne and the duty value is then calculated. After completion of this step, the operation now moves to the next step 140, where the actual supercharge pressure $P_2$ detected by the supercharge pressure sensor 12 is subtracted from the normal time target supercharge pressure $P_{S1}$ set at the target supercharge pressure setting portion 16 and the correction value is calculated in the operational unit 18 in accordance with the difference P. After this operation, the program step now moves to the step 170, where the correction value is applied to the adder 8 through the second change-over switch 28 and the duty value is corrected by this correction value and then the corrected duty value is applied to the electromagnetic valve 10 through the first change-over switch 26.

However, when the result of the decision is YES in the steps 110 and 120, respectively, that is, the crank angle sensor or the air flow meter is abnormal, the operation moves to the step 150, where the abnormal time target supercharge pressure $P_{S2}$ is set. That is, when the abnormal condition occurs in either step 110, or step 120, each abnormal signal is produced from the crank angle sensor abnormal decision unit 22 or the air flow meter abnormal decision unit 20 and each of the abnormal signals is applied to the first, second and third change-over switches 26, 28 and 30 through the OR circuit 24, thus operating the switches 26, 28 and 30. As a result, the calculating operation of the duty value for carrying out the table look-up can be made out of control and the control is effected only by the feedback corection as described in the foregoing. At the same time, the abnormal time target supercharge pressure $P_{S2}$ from the abnormal time target supercharge pressure setting portion 32 is applied to the substracter 14. After this operation, the program step now moves to the next step 160.

In the step 160, the abnormal time target supercharge pressure $P_{S2}$ is substracted in the subtracter 14 by the actual supercharge pressure $P_2$ detected by the supercharge pressure sensor 12 and the difference P between them is applied to the operational unit 18, where the correction value is calculated. Then, the operation moves to the next step 170.

In the step 170, the correction value is applied to the electromagnetic value 10 through the second and first switches 28, 26 and the electromagnetic valve 10 can be opened in accordance with the correction value.

As described in the foregoing, in the normal condition, the control can be performed only in the zone B in the table shown in FIG. 5. On the other hand, in the abnormal time, the feedback correction must be done over the entire zones in the table. However, as there remains some zones such as the zone A, the zone B, where the supercharge pressure can not be adjusted to the preset valve by the control, the existence of the integral component in the operational unit 18 during the correcting can no longer permit to adapt the actual condition. In that case, it is preferred to demarcate the upper and lower limits and yet to take the range between the two limits, to be large.

Figure 8:
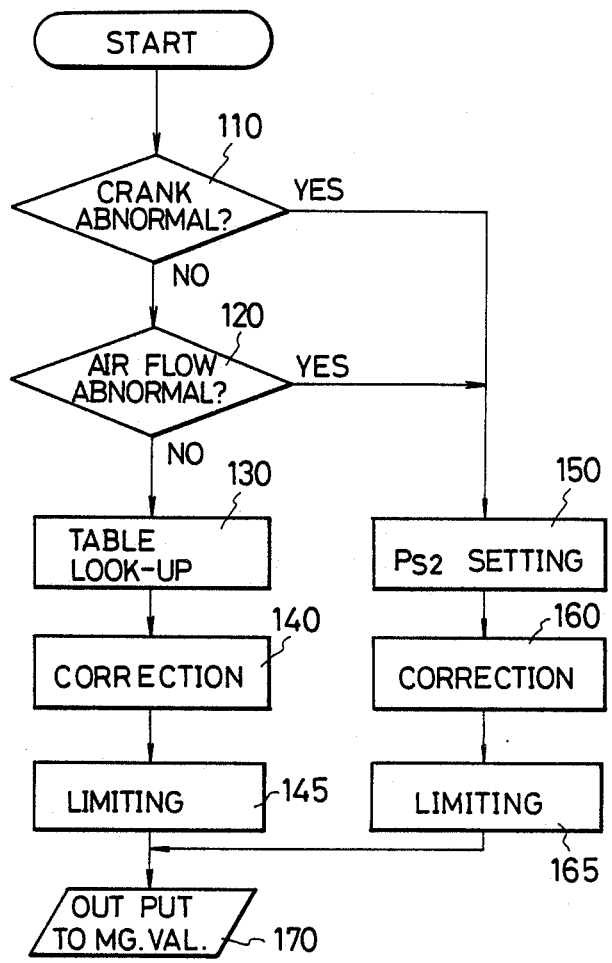
FIG. 8 is another embodiment of the fail safe control flow chart for explaining the operation of the fail safe control unit, according to the present invention.

FIG. 8 shows another control flow chart in the case that the upper and lower limits are set by the limiter 34. The steps of FIG. 8 is same as those shown in FIG. 7 except for the provision of the steps 140 and 160, where the upper and lower limits are imposed by the limiter 34 after the correction value is calculated in the steps 140 and 160, respectively.

In this manner as described, when the crank angle sensor 83 and/or the air flow meter 11 becomes defective, the target supercharge pressure is replaced with a low abnormal time target supercharge pressuer $P_{S2}$ and the control is carried out by only the feedback correction, thereby preventing the engine being damaged by effectively utilizing the characteristics of the variable capacity turbocharger while keeping or maintaining the safe drive of the car.

As a method of controlling the variable capacity turbocharger, the following embodiment according to the present invention is possible. Namely, instead of performing the table look-up from the engine speed Ne and the fuel supply pulse width $T_P$, a table look-up operation is performed for a predetermined table in which the supercharge pressure is made maximum from only the inlet air flow rate $Q_A$. This embodiment is based on the fact that the duty value can be calculated from only the inlet air flow rate $Q_A$ in order to control the supercharge air pressure as each of the the duty values is located on the equal air flow rate lines, as will be appreciated from the trend of the duty values shown in FIG. 5. Although not shown in the embodiment described just above, since the engine speed is not required compared with the embodiment shown in FIG. 6, only the air flow meter and its abnormal decision unit 20 are required but the OR circuit can be dispensed with in this embodiment. In this case, the percentage of determining that the abnormal decision unit 20 will determine the abnormal condition will be decreased and a system having a higher reliability is obtainable.

Moreover, the embodiment shown in FIG. 6 is suitable for the case in which the supercharge pressure is controlled, but it is also applicable to an ignition timing control for the engine, as another embodiment according to the present invention. Namely, in this embodiment, the fuel supply pulse width $T_P$ is calculated from the engine speed Ne and the inlet air flow rate $Q_A$ and the table look-up operation is carried out in accordance with the fuel supply pulse width $T_P$ thus calculated and the engine speed Ne, so as to determine the ignition timing. More specifically, a crank angle P max at which the inner pressure of a cylinder becomes maximum is detected from a signal concerning cylinder inner pressure and the feedback correction is performed in order that the crank angle P max may reach a predetermined value, thus correcting the ignition timing of the engine.

When the crank angle sensor for detecting the engine speed Ne and the air flow meter for detecting the inlet air flow rate $Q_A$ are operating in a normal condition, respectively, the ignition timing calculated by the table look-up operation described in the foregoing is corrected by the inner pressure of the cylinder. When the abnormal condition occurs, however, the crank angle P max is corrected by the feedback control in response to the inner pressure of the cylinder, with the target crank angle P max being on the delay angle side, i.e. on the safe side in view of an knocking limit, so as to carry out the ignition timing control.

In the foregoing embodiments according to the present invention, the description has been made of the cases where the control is performed about the variable capacity turbocharger and the engine ignition timing. However, it is apparent that the present invention is not limited to the above embodiments but is applicable to various control units of the kinds in which various parameters are detected by detecters or sensors, controlled unit means or an engine is controlled by a basic control value calculated in accordance with the parameters, and the basic control value is corrected by the parameters together with the operating conditions of the controlled means, so as to keep the operation of the controlled means on the safe side when a trouble occurs in any of the detecters.

As described in the foregoing, the fail safe control unit according to the present invention is constructed in such a manner that each abnormal condition of sensor or detector for detecting parameters is detected so as to calculate each of basic control values and when the abnormal condition occurs in any of the detectors, the control based on the basic control value is stopped and one of the parameters detected from the operating conditions of the controlled means is compared with the abnaormal time target value which is set on the safe side for the controlled means, so as to carrfy out only a feedback correction in accordance with the difference between them, thereby enabling the controlled means to securely keep on operating on the safe side when any of the detectors becomes defective, and preventing the controlled means from being damaged.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A method of performing a fail safe control for a controlled means in accordance with different parameters, which comprises the steps of:

detecting at least one first parameter representative of the operating conditions of the controlled means through first detecting means;

detecting a second parameter representative of the operating conditions of the controlled means through second detecting means;

calculating through operational means a basic control value which controls said controlled means, based on the first parameter detected by said first detecting means;

detecting an abnormal condition of said first detecting means and for producing an abnormal signal through abnormal detecting means;

correcting said basic control value, by comparing the first parameter detected by said first detecting means with a predetermined first target value through correcting means (48) when the abnormal signal is not produced from said abnormal detecting means, in accordance with the difference therebetween; and controlling said controlled means through controlling means, by comparing the second parameter detected by said second detecting means with a predetermined second target value which is set on a more safe side than the first target value to control said controlled means when the abnormal signal is produced from said abnormal detecting means, in accordance with a control value calculated from the difference therebetween.

2. The method of performing a fail safe control for an engine as set forth in claim 1 wherein the method further comprises the step of limiting the corrected value within the upper and lower limts through limiting means.

3. A fail safe control unit for controlling an controlled means in a desired condition in accordance with different parameters, which comprises:

first detecting means for detecting at least one first parameter representative of the operating conditions of the controlled means;

second detecting means for detecting a second parameter representative of the operating conditions of the controlled means;

operational means for calculating a basic control value, which controls said controlled means in based on the first parameter detected by said first detecting means;

abnormal detecting means for detecting an abnormal condition of said first detecting means and for producing an abnormal signal;

correcting means for correcting said basic control value by comparing the first parameter detected by the first detecting means with a predetermined first target value when the abnormal signal is not produced from said abnormal detecting means, in accordance with the difference therebetween; and controlling means for controlling said controlled means, by comparing the second parameter detected by said second detecting means with a predetermined second target value which is set on a more safe side than the first target value to said controlled means when the abnormal signal is produced from the abnormal detecting means, in accordance with a control value calculated from the difference therebetween.

4. The fail safe control unit as set forth in claim 3 wherein said controlled means is an engine with a variable capacity turbocharger having a turbine operable by exhaust gas supplied through a guide path; said first detecting means is an engine speed sensor for sensing the engine speed and an engine load sensor for sensing the engine load; said second detecting means is a supercharge pressure sensor for sensing the supercharge pressure of the inlet air to be supplied to the engine; said operational means is constructed in such a manner that it calculates a basic control value for controlling the sectional area of the guide path in order that the supercharge pressure of the inlet air supplied to the engine may be a suitable value in accordance with the engine speed and the engine load; said abnormal detecting means is constructed in such a manner that it detects any abnormal condition of the engine speed sensor or the engine load sensor and to produce an abnormal signal; said correcting means is constructed that it compares the actual supercharge pressure detected by said supercharge pressure sensor with the first target supercharge pressure when the abnormal signal is not produced and corrects the basic control value in accordance with the difference therebetween; and said controlling means is constructed that it compares the actual supercharge pressure with the second target supercharge pressure which is lower than the first target supercharge pressure when the abnormal signal is produced and controls the controlled means so as to cancel the difference therebetween.

5. The fail safe control unit as set forth in claim 3 wherein said controlled means is an engine with a variable capacity turbocharger having a turbine operable by exhaust gas supplied through a guide path; said first detecting means is an inlet air flow sensor for detecting the inlet air flow rate for the engine; said second detecting means is a supercharge pressure sensor for sensing the supercharge pressure of the inlet air to be supplied to the engine; said operational means is constructed in such a manner that it calculates the basic control value for controlling the sectional area of the guide path in order that the supercharge pressure of the inlet air supplied to the engine may be a suitable value in accordance with the engine speed and the engine load; said abnormal detecting means is constructed in such a manner that it detects any abnormal condition of the engine speed sensor or the engine load sensor and to produce an abnormal signal, said correcing means is constructed that it compares the actual supercharge pressure detected by said supercharge pressure sensor with the first target supercharge pressure when abnormal signal is not produced and corrects the basic control value in accordance with the difference therebetween; and said controlling means is constructed that it compares the actual supercharge pressure with the second target supercharge pressure which is lower than the first target supercharge pressure when the abnormal signal is produced and controls the controlled means so as to cancel the difference therebetween.

6. The fail safe control unit as set forth in claim 3 wherein said controlled means is an engine for carrying out combustion by ignition; said first detecting means is an engine speed sensor for sensing the engine speed and an engine load sensor for sensing the engine load; said second detecting means is a crank angle sensor for sensing the crank angle which makes the inner pressure of a cylinder, produced within the cylinder of the engine to be maximum; said operational means is constructed in such a manner that it calculates the basic control value for controlling the ignition timing so as the output torque of the engine may be maximum in accordance with the engine speed and the engine load; said abnormal detecting means is constructed that it detects any abnormal condition of the engine speed sensor or the engine load sensor and produces an abnormal signal; said correcting means is constructed that it compares the actual crank angle detected by the crank angle sensor with a first target crank angle when the abnormal signal is not produced and corrects the basic control value in accordance with the difference therebetween and said controlling means is constructed that it compares the actual crank angle detected by the crank angle sensor with a second target crank angle which is more delayed in angle than the first target crank angle when the abnormal signal is produced and cancels the difference therebetween.

7. A fail safe control unit for controlling a turbocharger, said control unit comprising:
first detecting means for detecting an intake air flow toward an engine and the number of rotations of an engine;
first calculating means for calculating a fuel supply pulse width from the intake air flow toward the engine and the number of rotations of the engine output from the first detecting means;
second calculating means for calculating a duty value using a table with respect to the fuel supply pulse width and the number of rotations of the engine;
means for judging the abnormality of the operation of the first detecting means;
first and second setting means for respectively setting target supercharge pressures in the normal and abnoral operations of the first detecting means;
first switching means for switching outputs from the first and second setting means based on an output from the judging means;
third calculating means for calculating a compensated control value based on a difference between the detected supercharge pressure and the target supercharge pressure when the judging means judges an abnormality in the operation of the first detecting means; and
fourth means for compensating the duty value from the second calculating means based on the compensated control value from the third calculating means, said fourth means transmitting the compensated duty value to valve means for supplying a suitable intake air to the engine.

8. A fail safe control method comprising the steps of:
judging whether a crank angle sensor for detecting the number of rotations of an engine, and an airflow meter for measuring an intake air flow toward the engine are normally or abnormally operated;
calculating a fuel supply pulse width from the number of rotations of the engine and the intake air flow when the crank angle sensor and the airflow meter are normally operated;
calculating a duty value using a table with respect to the fuel supply pulse width and the number of rotations of the engine;
calculating a compensated value based on a first difference between the actual supercharge pressure and a target supercharge pressure in the normal state;
compensating the duty value based on the compensated value, and outputting the compensated duty value to valve means for supplying a suitable intake air to the engine;
outputting an abnormal signal from at least one of the crank angle sensor and the airflow meter when the at least one of the crank angle sensor and the airflow meter is abnormally operated;
setting a target supercharge pressure in the abnormal state, and calculating a second difference between the actual supercharge pressure and the target supercharge pressure in the abnormal state; and
compensating the duty value based on the second difference, and outputting this compensated duty value to the valve means.

9. A fail safe control method comprising the steps of:
judging whether an airflow meter for measuring an intake air flow toward an engine is normally or abnormally operated;
calculating a duty value using a predetermined table for maximizing the supercharge pressure from only the intake air flow when the airflow meter is normally operated;
calculating a compensated value based on a first difference between the actual supercharge pressure and a target supercharge pressure in the normal state;
compensating the duty value based on the compensated value, and outputting the compensated duty value to valve means for supplying a suitable intake air to the engine;
outputting an abnormal signal from the airflow meter when the airflow meter is abnormally operated;
setting a target supercharge pressure in the abnormal state, and calculating a second difference between the actual supercharge pressure and the targe supercharge pressure in the abnormal state; and
compensating the duty value based on the second difference, and outputting this compensated duty value to the valve means.

* * * * *